March 3, 1936. R. E. FRICKEY 2,032,407
TEMPERATURE MEASURING APPARATUS
Filed Oct. 2, 1933
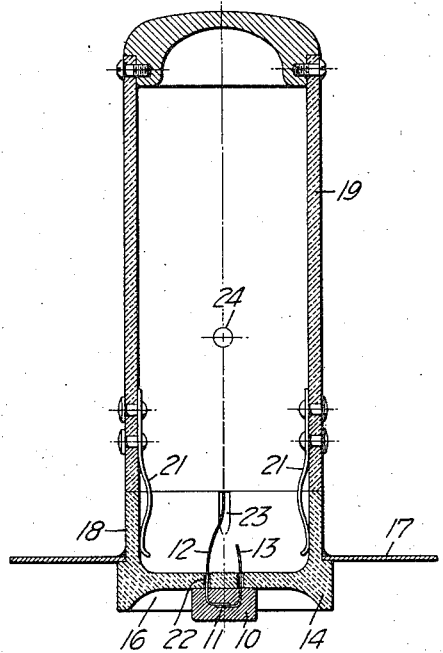
FIG_1_
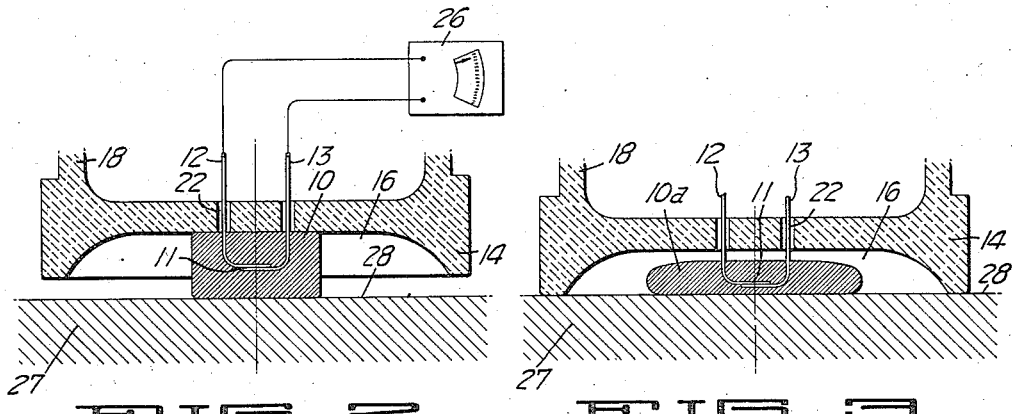
FIG_2_   FIG_3_
INVENTOR
Royal E. Frickey
BY
White, Prost, Flehr & Lothrop
ATTORNEYS Patented Mar. 3, 1936

2,032,407

UNITED STATES PATENT OFFICE 2,032,407

TEMPERATURE MEASURING APPARATUS

Royal E. Frickey, San Francisco, Calif., assignor to Welding Service, Inc., San Francisco, Calif., a corporation of California Application October 2, 1933, Serial No. 691,751

4 Claims. (Cl. 136—4)

This invention relates generally to apparatus for measuring or indicating the temperatures of various solid bodies. It has particular application to a relatively elevated temperature range for which the usual types of mercury thermometers and like devices are not suitable.

It is an object of the invention to provide an apparatus of the above character which will afford an accurate and reliable temperature reading irrespective of the presence of oxides or like foreign material upon the surface of the heated body.

A further object of the invention is to provide an apparatus which will measure the temperature of heated solid bodies without the necessity of providing an aperture or cavity in the body for enclosing a thermal couple or like temperature sensitive element.

A further object of the invention is to provide a simple and rugged form of apparatus for the purposes outlined, which can be operated without difficulty under field conditions.

Further objects of the invention will appear from the following description in which the preferred embodiment of the invention has been set forth in detail in conjunction with the accompanying drawing.

Referring to the drawing:

Figure 1 is a side elevational view, in cross section, illustrating apparatus incorporating the present invention.

Figures 2 and 3 are cross-sectional views illustrating diagrammatically the manner in which my apparatus is employed in measuring the temperature of bodies.

The present invention can best be explained after a detailed description of the apparatus illustrated in the drawing. This apparatus consists of a solid mass 10 of a suitable fusible metal, within which an electro-thermal couple 11 is embedded. This electro-thermal couple, or equivalent temperature sensitive element, may be of conventional construction, consisting for example of copper and iron wires 12 and 13, having their ends twisted, welded, or otherwise secured together.

To afford handling and applicating means for the arrangement described above, I have shown a body 14 of refractory material, which can be annular in contour. The lower face of body 14 is formed to provide a cavity 16 within which the fusible metal 10 is disposed. A guard 17 surrounds body 14, and may be of suitable material such as sheet metal. The upper portion of body 14 is shown in the form of an annular collar 18.

To facilitate use by an operator, a suitable handle 19 is shown, which is in the form of a tube of insulating material. The spring fingers 21 are shown secured to the lower end of this tube, for making detachable engagement with the collar 18. The lead wires 12 and 13 from the thermocouple 11 are shown extending through the apertures 22, and also through the slots 23, to the terminals 24 carried by the handle. These terminals facilitate making electrical connections to conductors leading to a suitable electrical measuring instrument, such as a micro-voltmeter.

The manner in which the apparatus described above is used in practice, can best be explained by reference to Figs. 2 and 3. In Fig. 2 it will be noted that a millivoltmeter, or like measuring instrument 26, has been diagrammatically shown electrically connected to the lead wires 12 and 13. The conductors extending to instrument 26 can be of metals like the lead wires 12 and 13, to avoid formation of secondary thermo-couples which might introduce errors in the indications secured. It will be presumed that an operator wishes to determine the temperature of a body 27, which is known to be within a temperature range above the point of fusion of the material 10 but below its boiling point. It will be noted that the body 27 in this instance is provided with a relatively flat exposed upper surface 28. The operator grasps the device of Fig. 1 and presses the lower face of the fusible metal 10 into contact with the upper flat surface 28 shown in Fig. 2, with the handle 19 in a generally upright position. Sufficient heat transfer occurs from the body 27 through the surfaces in contact to the fusible metal 10, to elevate the temperature of metal 10 to the point of fusion. After fusion the metal 10 is not dispersed but maintains itself in the form of a globule or pellet 10a, as shown in Fig. 3. The fused metal forms a much more effective heat transferring contact with the upper surface of body 27, so that its temperature continues to rise until a temperature level is attained approximating that of the body 27. More effective heat transferring contact is provided because the fused metal touches substantially all points of the relatively large intersurface area between it and the body 27. Likewise, immediately upon fusion of the metal 10 the body 14 moves downwardly into engagement with the upper surface 28, as shown in Fig. 3, and, since the electrothermal couple 11 is carried by the body 14, such a positioning of this body serves to definitely locate and retain the thermal couple immersed in the globule 10a. Thus the thermal couple 11 is likewise heated to substantially the same temperature as the globule 10a, to produce a corresponding current flow through the measuring instrument 26. After making a temperature measurement in this fashion, the fused metal can be discarded and a new thermal couple attached to the device of Fig. 1 with the fusible material 10 applied to the same.

The apparatus described above has many desirable characteristics. Even though the surface 28 of the body 27 may be coated with scale or oxide, a good heat transferring contact is established after the material 10 has fused. Likewise, since the thermal couple 11 is positioned so as to be immersed within the globule 10a, the operator may be assured that the temperature applied to this couple will be substantially the same as the temperature of the globule, even though there may be a slight shifting of the thermal couple relative to the body. It is of course evident that if a cavity were available in the heated body, a pool of fusible metal could be formed within this body, within which the thermal couple could in turn be immersed. However, in many instances such a cavity is not available, and it is undesirable to mutilate the surface of the heated body to form such a cavity. My apparatus makes it possible to take a temperature reading from a relatively flat surface of the body, since the material 10 when fused takes the form of a non-dispersing globule or pellet, as shown in Fig. 3.

It is of course evident that the fusible metal employed should be selected with regard to the temperature range within which it is desired to measure. For example, in measuring temperatures within a range from, say, 1000 to 1500 degrees Fahrenheit, I have used a low temperature alloy consisting of lead, tin and bismuth.

My apparatus has proven successful when used under conditions for which other forms of apparatus or methods are not applicable. For example, it has been employed to check the temperature of heated rail ends, preparatory to hardening the rail ends by chilling. In this particular application the surfaces of the rail ends become covered with scale and like foreign material of relatively poor conductivity, so that a temperature reading obtained by placing a thermal couple or like element directly into contact with a rail surface is inaccurate and unreliable. With my apparatus the temperature of such a body can be determined with a high degree of accuracy and reliability and under field conditions where complicated or delicate instruments cannot be used.

If it is desired to calibrate my apparatus in terms of a standard temperature scale, this can be accomplished in various ways, as for example by checking readings of instrument 26 against readings of a radiation pyrometer on the same heated body.

I claim:

1. In electrical temperature measuring apparatus, an electro-thermal couple, a solid mass of material in which said couple is embedded, said material being fusible within the temperature range for which the apparatus is adapted to measure, and applicating means for contacting said material with a heated surface.

2. In electrical temperature measuring apparatus, an electro-thermal couple, a solid mass of material in which said couple is embedded, said material being fusible within the temperature range for which the apparatus is adapted to measure, and applicating means for contacting said material with a heated surface, said applicating means including means for retaining said couple immersed in said material when fused.

3. In electrical temperature measuring apparatus, an electro-thermal couple, a mass of fusible metal in which said couple is embedded, said metal being fusible within the temperature range for which the apparatus is adapted to measure, and applicating means for contacting one face of said mass with the upper surface of a heated body, said applicating means including means for retaining said couple immersed in said material when fused.

4. In electrical temperature measuring apparatus, an electro-thermal couple, a mass of fusible metal in which said couple is embedded, said metal being fusible within the temperature range for which the apparatus is adapted to measure, and applicating means for contacting one face of said mass with the upper surface of a heated body, said applicating means including means for retaining said couple immersed in said material when fused, the material when fused forming a substantially unconfined globule.

ROYAL E. FRICKEY.